(12) United States Patent
Shimanaka et al.

(10) Patent No.: US 9,296,260 B2
(45) Date of Patent: *Mar. 29, 2016

(54) PNEUMATIC TIRE TREAD

(75) Inventors: Nanae Shimanaka, Kyoto (JP); Salvatore Pagano, Clermont-Ferrand (FR); Nicolas Dautrey, Tokyo (JP)

(73) Assignee: COMPAGNIE GENERALE DES ESTABLISSEMENTS MICHELIN, Clermont-Ferrand (FR)

(*) Notice: Subject to any disclaimer, the term of this patent is extended or adjusted under 35 U.S.C. 154(b) by 63 days.

This patent is subject to a terminal disclaimer.

(21) Appl. No.: 14/130,305

(22) PCT Filed: Jun. 30, 2011

(86) PCT No.: PCT/JP2011/065115
§ 371 (c)(1),
(2), (4) Date: Apr. 9, 2014

(87) PCT Pub. No.: WO2013/001651
PCT Pub. Date: Jan. 3, 2013

(65) Prior Publication Data
US 2014/0216619 A1    Aug. 7, 2014

(51) Int. Cl.
*B60C 11/13* (2006.01)
*B60C 1/00* (2006.01)
*B60C 11/04* (2006.01)

(52) U.S. Cl.
CPC ........... *B60C 11/1353* (2013.04); *B60C 1/0016* (2013.04); *B60C 11/042* (2013.04); *B60C 2011/1361* (2013.04)

(58) Field of Classification Search
CPC ............... B60C 11/00; B60C 11/0008; B60C 2011/0016; B60C 1/00; B60C 1/0016; B60C 11/04; B60C 11/042; B60C 11/045; B60C 11/047; B60C 11/13; B60C 11/1353; B60C 11/1307; B60C 11/1338; B60C 11/1346; B60C 2011/1361
USPC ........ 152/209.2, 209.3, 209.4, 209.5, 209.19, 152/209.21, 900, 901, DIG. 1
See application file for complete search history.

(56) References Cited

U.S. PATENT DOCUMENTS

| 6,119,744 A * | 9/2000 | Tsukagoshi ............... 152/209.19 |
| 2011/0126952 A1* | 6/2011 | Nakamizo ................ 152/209.21 |
| 2011/0259498 A1* | 10/2011 | Pagano et al. ................ 152/450 |

FOREIGN PATENT DOCUMENTS

| JP | 624610 A | 1/1987 |
| JP | 3276802 A | 12/1991 |
| JP | 10250317 A | 9/1998 |

OTHER PUBLICATIONS

PCT/JP2011/065115—International Search Report (English translation included), dated Sep. 27, 2011, 2 pages.

*Primary Examiner* — Eric Hug
(74) *Attorney, Agent, or Firm* — Dickinson Wright PLLC

(57) ABSTRACT

A pneumatic tire tread capable of mitigating air column resonance and maintaining drainage performance while ensuring that the flexible fences are abraded to a similar extent to the tread portion is formed from a rubber composition and has a tread portion, in which is formed at least one primary groove of depth D and width W having a base surface and two opposing walls, and multiple flexible fences of thickness E, which extend inside the primary groove such that at least 70% of the cross-sectional area of the primary groove is blocked and which are disposed at intervals such that at least one of the multiple flexible fences is in the primary groove in the tread contact patch when the tire is rolling, wherein the multiple flexible fences are formed from at least a rubber composition for fences that is different from the rubber composition for the tread portion; and the rubber composition for fences has an abrasion index that is more than or equal to twice the abrasion index of the rubber composition of the tread portion.

9 Claims, 3 Drawing Sheets

PNEUMATIC TIRE TREAD

This application claims benefit of the filing date of PCT/JP2011/065115, filed Jun. 30, 2011, the entire contents of which is incorporated herein by reference for all purposes.

BACKGROUND

1. Field

The present invention relates to a pneumatic tire tread, and in further detail, to a pneumatic tire tread with which flexible fences are formed in the primary groove of the tread and it is thereby possible to reduce air column resonance and maintain water drainage performance while ensuring that the flexible fences and tread portion will be abraded to a similar extent.

2. Description of Related Art

The air column resonance of a primary groove formed in the tread of a tire is generated by resonance inside a tube (air column) formed between the primary groove and the road surface, and this resonance frequency depends on the length of the air column of the primary groove formed with the road surface.

This air column resonance is manifested in the form of noise inside and outside the vehicle and often peaks at approximately 1 kHz, which is audible to the human ear. Technology for reducing the air column resonance of the primary groove includes disposing so-called flexible fences, that is, projections, which extend from the groove walls or groove base of the primary groove and block all or the majority of the primary groove such that the air column resonance is reduced by blocking the flow of air in the direction in which the primary groove is formed. Nevertheless, when the tire runs on a wet road surface, the water that has entered the primary groove is prevented from flowing through the primary groove because air is prevented from flowing in the direction in which the primary groove is formed. There is therefore a reduction in drainage of water between the pneumatic tire and the road surface and as a result, there is a reduction in operating safety on wet road surfaces.

FIG. 4 of patent document 1 discloses technology that serves to reduce air column resonance and impart water drainage wherein three group fences 3 (flexible fences) that extend from opposing walls on the inside of the groove and the groove base, respectively, are disposed such that they are each separated by a space.

Moreover, FIG. 3 of patent document 2 discloses technology that serves to reduce air column resonance and improve water drainage by disposing a diaphragm 30 (flexible fence) that extends from the groove base inside the primary groove such that the majority area from the opening in the primary groove does not contact the groove walls.

[Patent document 1] JP-A H11-105511
[Patent document 2] JP-A 2006-341655

SUMMARY

Problems to be Solved

Nevertheless, according to the technology disclosed in patent documents 1 and 2, in order to function as a flexible fence, the flexible fence is thin in the direction of tire circumference and therefore can easily change shape. As a result, depending on the material that is used, the flexible fence that easily changes shape will be abraded less than the tread portion with repeated running and there is therefore a difference in the amount of abrasion between the flexible fence and the tread portion. This difference in the amount of abrasion is a problem in that the flexible fence projects from the surface of the tread portion (the surface of the tread that forms the tread contact patch) and the flexible fence that projects from the tread surface hits the road surface when running and generates noise. This generation of noise is contrary to the original role of the flexible fence, which is reduction of air column resonance and noise mitigation. Moreover, there is a problem in that projection of the flexible fence from the tread portion causes unintentional grounding with the road surface and leads to early abrasion and loss of the flexible fence.

Therefore, the present disclosure is intended to solve the problems of the prior art, and the purpose thereof is to provide a pneumatic tire tread with which it is possible to maintain water drainage performance while preventing projection of the flexible fence from the tread portion and preventing a reduction in the air column resonance-reducing effect that is attributed to early abrasion of the flexible fence.

Means for Solving the Problems

In order to accomplish the above-mentioned purpose, the present disclosure relates to a pneumatic tire tread that is formed from a rubber composition and that contacts the road surface when the tire rolls, the pneumatic tire tread being characterized by having a tread portion, in which is formed at least one primary groove of depth D and width W having a base surface and two opposing walls, and multiple flexible fences of thickness E, which extend inside the primary groove such that at least 70% of the cross-sectional area of the primary groove is blocked and which are disposed at intervals such that at least one of the multiple flexible fences is in the primary groove in the tread contact patch when the tire is rolling, wherein the multiple flexible fences are formed from at least a rubber composition for fences that is different from the rubber composition for the tread portion; and the rubber composition for fences of the flexible fences has an abrasion index that is more than or equal to twice the abrasion index of the rubber composition of the tread portion.

According to embodiments of the present invention configured in this way, flexible fences are formed inside the primary groove such that they block at least 70% of the cross-sectional area of the primary groove, and are disposed at intervals such that at least one is present inside the primary groove in the tread contact patch when the tire is rolling. As a result, the length of the air column of the primary groove formed with the road surface is different from when there is no flexible fence and the peak air column resonance is easily outside the frequency band audible to the human ear. As a result, the noise due to air column resonance is mitigated.

Furthermore, according to embodiments of the present invention, the rubber composition for fences uses a rubber composition having an abrasion index that is more than or equal to twice the abrasion index of the rubber composition that forms the tread portion, and therefore ensures that the flexible fences will be abraded to a similar extent to the tread portion. After reading this specification, a person skilled in the art will be able to obtain a formulation for a rubber composition for fences that readily wears to a similar extent to the tread portion by appropriately adjusting the formulation of the rubber composition by means of a method in which, among the components constituting the rubber composition for fences, for example, a filler of (non-reinforcing) microparticles having a median grain size (by weight average) of greater than 1 μm in a greater amount than in a conventional rubber composition for treads, typically more than or equal to 50 phr, is used as the filler, in order to obtain a rubber composition for fences which has an abrasion index that is more than or equal to twice the abrasion index of the rubber composition of the tread portion.

As is well known to a person skilled in the art, microparticles having a median grain size (by weight average) larger than 1 μm are also called a non-reinforcing filler. These microparticles are either completely or virtually a non-reinforcing filler and therefore, the abrasion index is high. Thus, the abrasion rate of a rubber composition increases when such microparticles are added. Examples of such microparticles are inorganic fillers such as chalk, natural silicates, precipitated silica, alumina, chemically synthesized fillers, barium sulphates, metal oxides (Mg, Zn, Al, and the like), and mixtures thereof, and organic fillers such as short fibres, thermoplastic fibres, biodegradable compounds, cellulose derivatives, and mixtures thereof. Herein, these microparticles are preferably absent from or hardly used in the tread portion, for example, the preferred content is less than 40 phr, more preferably less than 30 phr.

Regarding determination of the grain size and the median grain size (or the apparent median diameter of microparticles as estimated assuming a generally spherical shape), a variety of conventional methods can be used, such as laser diffraction (refer to ISO-8130-13 or JIS K5600-9-3). Preferably simple grain size analysis by mechanical screening is used. The procedure consists of placing a specific amount of sample (for instance, 200 g) and screening for 30 minutes using a variety of screen diameters (by varying the mesh size at 1000, 800, 630, 500, 400, . . . , 100, 80, 63 μm at a progression rate of 1.26) on a vibration table. From this weight, the size of the particles on each screen is weighed using a precision scale and the % of that size is estimated for each mesh diameter versus the total mass of the substance. Finally, the median grain size (or apparent median diameter) or average grain size (or apparent average diameter) by mass is calculated by a conventional method from a histogram of the grain size distribution.

In addition, according to another exemplary method for making the abrasion index of a rubber composition for fences twice the abrasion index of the composition of the rubber forming the tread portion, the amount of reinforcing filler among the components constituting the rubber composition for fences may be reduced, typically to an amount of less than phr, with or without the addition of the above-mentioned non-reinforcing filler, while at the same time the amount of reinforcing filler among the components constituting the composition of the rubber forming the tread portion may be increased, typically to an amount of greater than 70 phr.

Here, when the flexible fences contact the road surface directly as they pass through the tread contact patch while the tire is rolling, grounding pressure and slipping are produced between the road surface and the flexible fences due to the counterforce that is received when the tip of the flexible fences contacts the road surface. According to the present invention, the abrasion index of the rubber composition for the fences is greater than the abrasion index of the rubber composition of the tread portion and therefore, even if there is little grounding pressure and slipping due to deformation of the flexible fences, abrasion occurs and as a result, the flexible fences are abraded to a similar extent to the tread portion. In other words, when the abrasion index of the rubber composition for the fences is less than twice the abrasion index of the rubber composition of the tread portion, it is impossible to ensure that the flexible fences will be abraded to a similar extent to the tread portion because the flexible fences will not be abraded under low grounding pressure and slipping that are generated when the flexible fences contact the road. An abrasion index that is more than or equal to twice is appropriate according to the inventors' evaluation (particularly in terms of water drainage and flexible fence abrasion performance) of a pneumatic tire tread with which air column resonance is reduced and water drainage is maintained while ensuring that the flexible fences will be abraded to a similar extent to the tread portion. The inventors analytically and experimentally identified that the above-mentioned water drainage and abrasion performance are effectively realized when this index is within the above-mentioned range (more than or equal to twice).

An example of a method for producing a tire tread having flexible fences is described in a 2009 patent application filed by the inventors (WO2010/146180 published on 23 Oct. 2010).

The term "groove" here refers to a space having width and depth that is formed by using another surface (base surface) to join two opposing surfaces (walls) that do not normally contact with one another.

Moreover, the term "primary groove" refers to a groove that is primarily responsible for drainage of fluid and is relatively wide among the various grooves formed in the tread. The primary groove is often the groove that extends in the direction of tire circumference linearly, in zigzag fashion, or in undulating form, but can also be a relatively wide groove that extends at an angle in the direction of tire rotation and is primarily responsible for drainage of fluid.

Moreover, the "tread contact patch" is the surface region of the tread that contacts the road surface when the tire is mounted on an applicable rim as specified by the following industrial standards, the tire is filled with air to the rated internal pressure, and the tire carries the rated load.

The term "standards" here refers to industrial standards that are in effect where the tire is produced or used. For instance, in Europe the industrial standards are the "Standards Manual" of ETRTO (The European Tire and Rim Technical Organization); in the US they are the "Yearbook" of the TRA (The Tire and Rim Association, Inc.); and in Japan they are the "JATMA Yearbook" of JATMA (the Japan Automobile Tire Manufacturers Association). Moreover, the "applicable rim" is a rim that is specified in these standards in accordance with tire size; the "rated internal pressure" is the air pressure specified in accordance with the load capacity in these standards; and the "rated load" is the maximum allowable weight that the tire can carry.

Moreover, "abrasion of the rubber composition" is defined by JIS K6264-1 and JIS K6264-2. It means the volume of abrasion of the rubber composition as obtained by the Acron abrasion test. The volume of abrasion of a rubber composition is determined by finding the difference in mass before and after subjecting a vulcanized rubber test piece to testing using an Acron abrasion tester on the basis of the above-mentioned regulations. The number of rotations of the grinding wheel is set at 500 rotations for pre-operation and 3,000 rotations for the test itself and there is a 15 degree angle of inclination between the test piece and the grinding wheel. The test piece is pressed to the grinding wheel under added force of 27.0 N and the test piece rotates at a speed of 100 rotations/minute. Moreover, the "abrasion index" is the index of the above-mentioned "abrasion of the rubber composition", and a larger index indicates that the abrasion volume is high, that is, the abrasion speed is fast (tendency towards abrasion). This "abrasion index" is used in order to compare the abrasion of multiple rubber compositions and according to the results of the above-mentioned abrasion index, the numerical abrasion of a specific rubber composition is converted to 1.00, for instance, as a reference point and the numerical abrasion of a rubber composition that is the subject of comparison is obtained by calculation using the same conversion rate. A numerical abrasion index that is twice indicates that the rubber composition that is the subject of comparison will be abraded twice as fast as the rubber composition that serves as the reference point.

The amount of each structural component contained in the rubber composition is represented by phr (parts by mass per 100 parts by mass of elastomer or rubber). Furthermore, unless otherwise specified, the percent (%) is wt %, a range represented as "between a and b" means greater than a and less than b (does not include the upper and lower limiting numbers), and a range represented as "from a to b" represents more than or equal to a and less than or equal to b (includes the upper and lower limiting numbers).

Moreover, as is well known, the "'diene' elastomer or rubber" is an elastomer (or several types of elastomers), that is a homopolymer or copolymer, derived at least in part from a diene monomer (conjugate monomer or monomer that is not conjugate and has two carbon-carbon double bonds).

According to the present invention, preferably, the abrasion index of the rubber composition for fences that forms the flexible fences is more than or equal to four times and less than or equal to twenty times the abrasion index of the rubber composition of the tread portion. In the present invention constituted in this manner, abrasion of the flexible fences can be more reliably achieved to a similar extent to the tread portion while maintaining drainage performance and mitigating air column resonance. In other words, when the abrasion index of the rubber composition for fences is greater than 20 times the abrasion index of the composition of the rubber forming the tread, the flexible fence within the primary groove will be abraded at an early stage due to an excessively high rate of abrasion of the flexible fence, and therefore there may be a risk of lowering the effect of reducing the air-column resonance produced by the flexible fence.

According to the present invention, the thickness E of the flexible fences is preferably more than or equal to 0.3 mm and less than or equal to 1.0 mm.

According to the present invention configured as such, it is possible to guarantee water drainage performance and to ensure that the flexible fences will be abraded to a similar extent to the tread portion while mitigating air column resonance noise. That is, when the flexible fences are thinner than 0.3 mm, there is a chance that the flexible fences will be pushed down by air pressure and there will be a reduction in the air column resonance noise-mitigating effect. Moreover, when the fences are knocked down, they will become difficult to contact with the ground surface at the tread contact patch and therefore, there is a chance that there will be a marked reduction in the rate of abrasion of the flexible fences when compared to the rate of abrasion of the tread portion and the flexible fences will project from the tread portion. On the other hand, when the flexible fences are thicker than 1.0 mm, the percentage of open primary groove cross section will be smaller when the flexible fences fall down into the primary groove and there will be a reduction in drainage performance.

Effect of Invention

By means of the pneumatic tire tread of the present invention, it is possible to reduce air column resonance and maintain water drainage performance while ensuring that the flexible fences are abraded to a similar extent to the tread portion.

DETAILED DESCRIPTION OF SPECIFIC EMBODIMENTS

Figure 1:
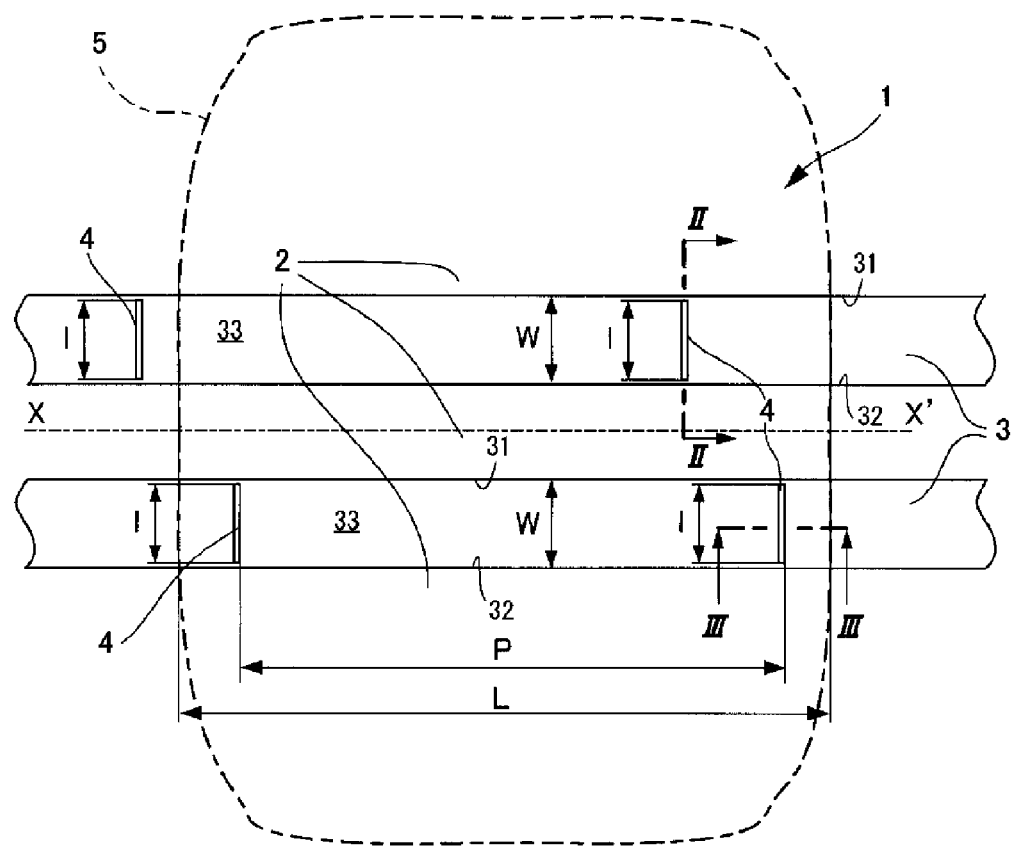
FIG. 1 is a schematic drawing of the pneumatic tire tread that is an embodiment of the present invention.

Preferred embodiments of the present invention will now be described while referring to the drawings.

First, the pneumatic tire of one embodiment of the present invention will be described using FIGS. 1 to 3.

FIG. 1 is a schematic drawing of the tread portion of a pneumatic tire of one embodiment of the present invention; FIG. 2 is an enlarged cross section of the tread portion of a pneumatic tire as seen along II-II in FIG. 1; and FIG. 3 is an enlarged cross section of the tread portion of a pneumatic tire as seen along in FIG. 1.

First, as shown in FIG. 1, 1 is a pneumatic tire tread 1 of the present embodiment, and the pneumatic tire tread 1 has a tread portion 2 and flexible fences 4 that are described later. Two primary grooves 3 of width W extending in the tire circumferential direction shown by XX' are formed in tread portion 2. Primary groove 3 has three surfaces, that is, opposing walls 31 and 32 and base surface (base part) 33. It should be noted that the tire size in this example is 225/55R16 and the direction of tire rotation of tread portion 2 is not specified. According to the present embodiment, opposing walls 31 and 32 each extend perpendicularly to the tire radius, groove width W is 14.5 mm, and groove width D is 8.0 mm.

This drawing shows tread contact patch 5 when the tire is filled to the rated air pressure and is carrying the rated load and the tread contact patch length L at this time. It should be noted that according to the "ETRTO Standard Manual 2011," the appropriate rim for this size is 7J, the rated internal pressure is 250 kPa, and the rated load is 690 kg. According to the present embodiment, tread contact patch length L is 143 mm.

Each primary groove 3 that passes through tread contact patch 5 as the tire is turning forms an air column with the road surface and the resonance frequency of the primary columns 3 is dependent on the length of the air columns formed in this way. According to the present embodiment, flexible fences 4 are disposed in primary groove 3 as shown in FIGS. 1 to 3 in order to vary the length of the air columns and thereby vary the frequency of the air column resonance. As shown in FIG. 1, each flexible fence 4 formed in primary groove 3 that goes around the tire once is disposed at an interval P, which is an interval shorter than the tread contact patch length L such that at least one flexible fence is always in the tread contact patch 5 of each primary groove 3.

Figure 2:
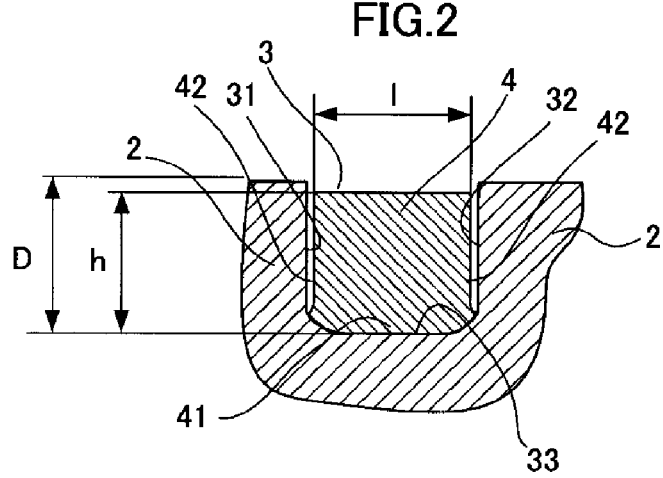
FIG. 2 is an enlarged cross section of the pneumatic tire tread as seen along II-II of FIG. 1.
Figure 3:
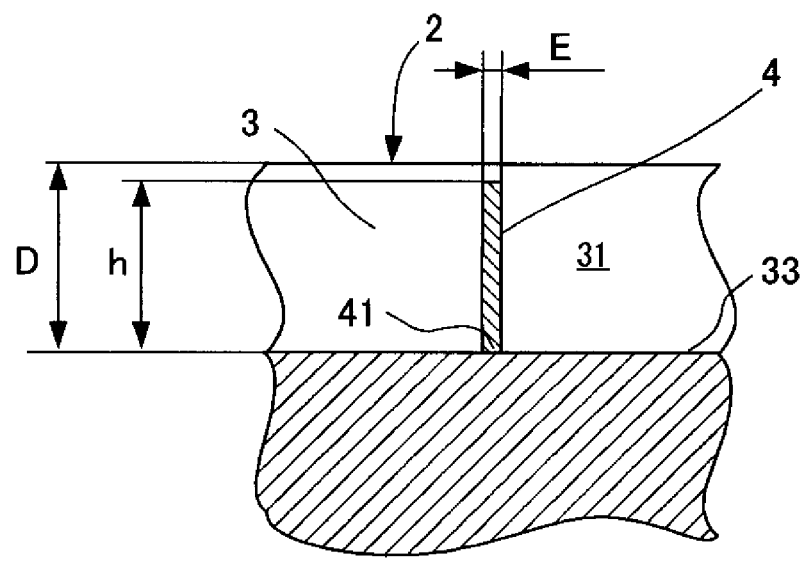
FIG. 3 is an enlarged cross section of the pneumatic tire tread as seen along of FIG. 1.

Next, as shown in FIGS. 2 and 3, the base parts 41 of these flexible fences 4 are connected as illustrated to the groove base part 33 of the primary grooves 3 and, as shown in FIG. 3, the flexible fences 4 extend in the direction of the tire radius (perpendicular to the tire axis of rotation). Moreover, as shown in FIG. 2, side parts 42 on both sides of flexible fences 4 are disposed such that with the exception of the above-mentioned connected parts (33), a specific space is formed with opposing walls 31 and 32 of primary groove 3.

As shown in FIG. 1, flexible fences 4 are formed such as to extend perpendicular to the direction in which the primary grooves 3 extend. Flexible fences 4 have a rectangular cross section, and this rectangular cross section has width 1 (refer to FIG. 2) and thickness E (refer to FIG. 3).

Moreover, as shown in FIG. 2, the flexible fences 4 are formed into a rectangle as seen from the lengthwise direction of primary groove 3 (from the front), and as shown in FIGS. 2 and 3, the flexible fences have a height h that is somewhat lower than the depth D of the primary grooves.

The flexible fences 4 are formed such as to block at least 70% of the cross section of the primary groove 3, and are formed such as to collapse under air pressure from a liquid such as the water that flows through the primary groove 3. According to the present embodiment, thickness E of the flexible fences 4 is 0.6 mm. Moreover, according to the present embodiment, as shown in FIG. 2, the height h and width 1 of the flexible fences are a height h of 7.0 mm and width 1 of 13.5 mm versus a primary groove 3 depth D of 8.0 mm and groove width W of 14.5 mm such that approximately 87% of the cross section of the primary groove 3 is blocked.

It should be noted that, for instance, according to the tire in the present embodiment, the flexible fences 4 can also be rectangular having a height h of approximately more than or equal to 5.6 mm such that at least 70% of the cross section of the primary grooves is blocked. It should be noted that the tire is not restricted to this example of the embodiment. The groove width W and groove depth D of the tire primary groove 3 can be changed and the width 1 and height h of the flexible fences 4 can be changed accordingly as long as at least 70% of the cross section of primary groove 3 is blocked.

According to the present embodiment, flexible fences 4 are formed from a rubber composition for fences that is different from the rubber composition for tread 2. The rubber composition for fences contains non-reinforcing filler, which is at least 50 phr (200 phr in the present embodiment) of microparticles having a median grain size (by weight average) of more than or equal to 1 μm. This non-reinforcing filler is not contained in the rubber composition that forms the tread 2. This non-reinforcing filler is used in order to produce a faster abrasion rate at the flexible fences than at the tread 2. Such a non-reinforcing filler can be an inorganic filler selected from chalk, natural silicate, precipitated silica, alumina, a filler obtained by chemical synthesis, barium sulphate, metal oxides (such as Mg, Zn, or Al oxide) and mixtures thereof, or an organic filler selected from short fibres, thermoplastic fibres, biodegradable compounds, cellulose derivatives, and mixtures thereof. When the rubber composition that forms tread 2 contains such microparticles (non-reinforcing), the microparticles (non-reinforcing) are added in a very small amount. Preferably the difference from the content in the rubber composition for fences is more than or equal to 20 phr, more preferably more than or equal to 30 phr. In other words, when the rubber composition for fences comprises more than or equal to 50 phr of such microparticles (non-reinforcing), the rubber composition that forms the tread should comprise preferably less than 30 phr, more preferably less than 20 phr, of such microparticles (non-reinforcing).

Next, the state when the pneumatic tire tread of one embodiment of the present invention is running on a wet road surface will be described using FIGS. 4 and 5.

Figure 4:
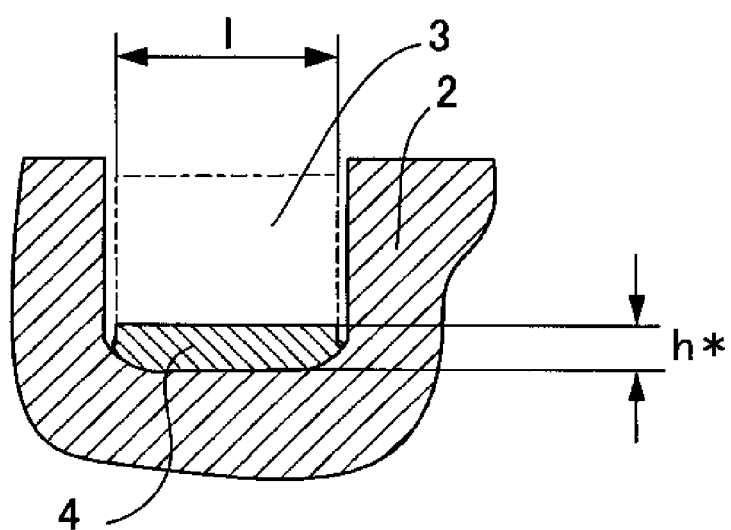
FIG. 4 is an enlarged cross section of the pneumatic tire tread as seen along II-II in FIG. 1 that is also shown in FIG. 2, and shows the state where the tire is running on a wet road surface.
Figure 5:
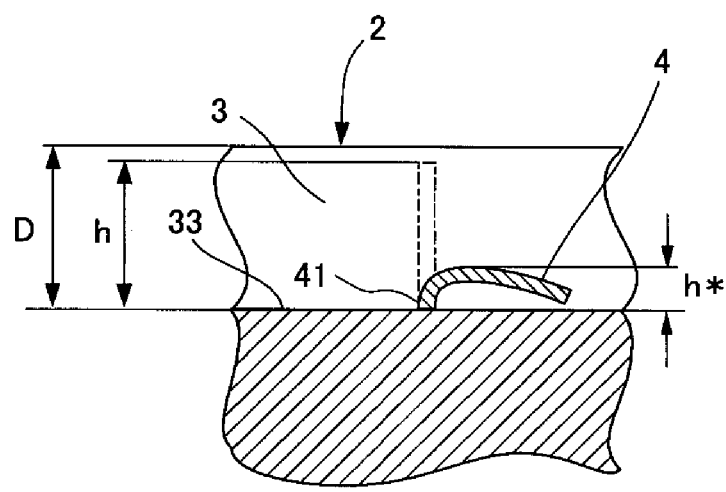
FIG. 5 is an enlarged cross section of the pneumatic tire tread as seen along in FIG. 1 that is also shown in FIG. 3, and shows the state where the tire is running on a wet road surface.

FIG. 4 is an enlarged cross section showing the pneumatic tire tread as seen along II-II in FIG. 1 when the tire is running on a wet road surface, and FIG. 5 is an enlarged cross section showing the pneumatic tire tread as seen along in FIG. 1 when it is running on a wet road surface.

As shown in FIGS. 4 and 5, flexible fences 4 formed from a rubber composition for fences that is different from tread 2 collapse or bend under water pressure generated by a liquid such as water passing through the inside of primary groove 2 when the tire is running on a wet road surface. As a result, height decreases to h* and this reduction in height opens the necessary part of primary groove 3 to guarantee water drainage.

Figure 6:
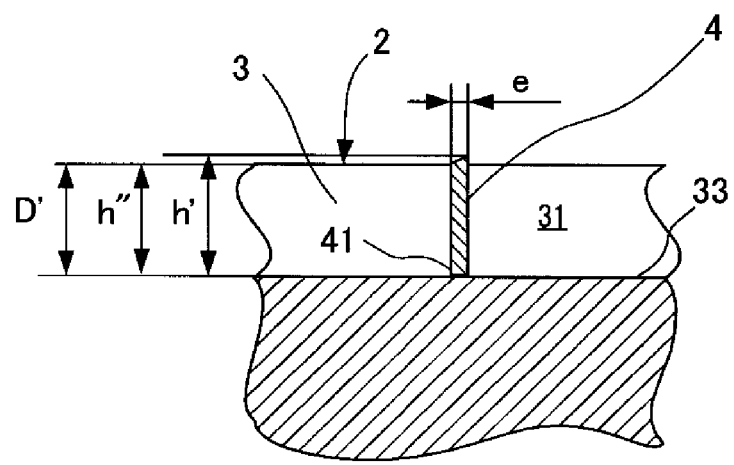
FIG. 6 is an enlarged cross section of the pneumatic tire tread as seen along in FIG. 1 that is also shown in FIG. 3, and is a schematic representation of the state where the groove depth of the tread portion has been abraded by approximately 30%.

Next, the state after the tread has been abraded in the pneumatic tire tread according to an embodiment of the present invention is shown in FIG. 6.

FIG. 6 is an enlarged cross section showing the pneumatic tire tread as seen along in FIG. 1 that has been abraded to a groove depth of approximately 30%.

FIG. 6 shows the state where after running a specific distance, the groove depth D of the primary groove 3 has been reduced to D', which is shallower than initial height h of flexible fences 4 due to abrasion. Once the tire has run for a specific distance, the flexible fences 4 formed by rubber composition for fences that is different from tread 2 are obliquely abraded at the tip that contacts the road surface such that the height of the fences is reduced from the initial height h to h' on the high side and h" on the low side, and the height h" on the low side is the same as the depth D' of the primary groove.

It should be noted that as long as a modified version of the rubber composition for fences has the above-mentioned operation, it can be used for a part (such as the connecting part (33) (refer to FIGS. 2 and 3)) or all (not illustrated) of the base part 33 of the primary groove 3 where the flexible fences 4 are connected. In such a case, the production process can be simplified because the flexible fences and the base part 33 of the primary groove can both be formed from the rubber composition for fences.

As long as the operation is the same as described above, in other modifications of the present embodiment, the flexible fences 4 formed from the rubber composition from fences can be partitioned multiple times, the flexible fences can be formed such that they are connected to one or both of opposing walls 31 and 32 of primary groove 3 and extend in the direction of groove width, or the flexible fences connected in this way to walls 31 and 32 can be used in combination with the flexible fences 4 joined to the base 33 of the primary groove 3 (not illustrated).

The above-mentioned has described particularly preferred embodiments of the present invention, but the present invention is not limited to the illustrated embodiments and various modifications are possible.

EXAMPLES

In order to clarify the effects of the present invention, three rubber compositions were produced by the following steps to form the flexible fences of the tread in the present invention.

The rubber composition for the fences and the rubber composition forming the tread portion are produced preferably in an appropriate mixer, using two linked production steps known to a person skilled in the art, that is, a first production step (called the "non-production" step) for thermomechanical working or mixing at a high temperature wherein the maximum temperature is between 110 and 190° C., preferably 130 and 180° C., and a second mechanical working step ("production" step) wherein the temperature is lower, typically lower than 110° C., for instance, between 40 and 100° C. A crosslinking system is introduced to the finishing step (production step).

The method for producing a rubber composition for fences comprises at least the following processes:

a process wherein, according to the first ("non-production") step more than 50 phr of a filler A (where the particles are nanoparticles having an average grain diameter (by weight average) smaller than 500 nm) and more than 50 phr of a filler B (wherein the particles are microparticles having a median grain size (by weight average) greater than 1 μm) are mixed in the diene elastomer, and after the mixture is obtained or while the mixture is being obtained, the product is subjected one or more times to thermomechanical mixing up to a maximum temperature between 110 and 190° C.; process wherein the mixture is cooled to a temperature lower than 100° C.;

a process wherein, according to the second ("production") step, the crosslinking system is introduced; and a process wherein the mixture is mixed to a maximum temperature that is lower than 110° C.

In one example, the non-production step is performed during one thermomechanical process. During this process, all of the essential base components (diene elastomer, reinforcing filler and coupling agent as needed, non-reinforcing filler, and plasticizing system) are first introduced to an appropriate mixer such as a standard sealed mixer and then second, after mixing for example one to two minutes, the other additives except the crosslinking system, and coating agent or auxiliary finishing agent as optional components are introduced. The total mixing time during this non-production step is preferably between 1 and 15 minutes.

The mixture obtained in this way is cooled and then the crosslinking system is introduced to an open mixer, such as an open mill maintained at a low temperature (for instance, between 40 and 100° C.). This mixture is then mixed for several, for instance, 2 to 15, minutes (production step).

The crosslinking system is preferably a vulcanization system based on sulphur and an accelerator. An arbitrary compound that can react as a vulcanization accelerator of a diene elastomer in the presence of sulphur can be added. This compound is selected in particular from the group consisting of 2-mercaptobenzothiazyldisulphide (abbreviated "MBTS"), N,N-dicyclohexyl-2-benzothiazylsulphenamide (abbreviated "DCBS"), N-tert-butyl-2-benzothiazylsulphenamide (abbreviated "TBSS"), N-tert-butyl-2-benzothiazylsulphenimide (abbreviated "TBSI") and mixtures of these compounds. Preferably a sulphonamide primary accelerator is used.

Various known secondary vulcanizers or vulcanization activators, such as zinc oxide, stearic acid, and guanidine derivatives (particularly diphenylguanidine) can be added to the first non-production step and/or production step. The sulphur content is between, for instance, 0.5 and 3.0 phr, and the primary accelerator content is between, for instance, 0.5 and 5.0 phr.

The final product obtained in this way is, for instance, calendered into a sheet or a plaque or extruded into a rubber element that can be used as a tire tread, for instance.

Table 1 shows the content of each structural component in phr when silica was used as the reinforcing filler. One rubber composition (conventional example 1-1) used as the rubber composition for a tread (tread portion) and a flexible fence according to the prior art, and three rubber compositions used in the flexible fences of the tread according to the present invention (examples 1-1, 1-2 and 1-3) were prepared. These four rubber compositions each contained 100 phr of reinforcing filler in the form of silica, and the three rubber compositions of the examples further contained at least 50 phr of chalk microparticles as the non-reinforcing filler. The rubber composition of conventional example 1-1 was produced by conventional production methods and used in tread portion 2 of the tread of the present invention. That is, it was possible to compare the properties and the like (such as the "abrasion index") of the rubber composition of tread portion 2 of the tread in the present invention and the rubber composition of the flexible fences 4 of the tread in the present invention based on each value of the rubber composition in conventional example 1-1 and the rubber compositions of examples 1-1, 1-2 and 1-3 in the following tables 1 and 2.

Moreover, the following Table 2 shows the determined abrasion of each of the produced rubber compositions and the abrasion index when comparative example 1-1 served as the standard (1.00) as calculated from the determination results. The abrasion rate of the rubber composition becomes faster with an increase in the abrasion index.

TABLE 1

|  | Conventional example 1-1 | Example 1-1 | Example 1-2 | Example 1-3 |
|---|---|---|---|---|
| S-SBR (1) | 60 | 60 | 60 | 60 |
| BR (2) | 40 | 40 | 40 | 40 |
| Filler A (3) | 100 | 100 | 100 | 100 |
| Filler B (4) | 0 | 50 | 100 | 200 |
| Coupling agent (5) | 8 | 8 | 8 | 8 |
| Carbon black (6) | 5 | 5 | 5 | 5 |
| Oil (7) | 25 | 25 | 25 | 25 |
| Hydrocarbon-based resin (8) | 30 | 30 | 30 | 30 |
| ZnO (9) | 2 | 2 | 2 | 2 |
| Stearic acid (10) | 2 | 2 | 2 | 2 |
| Antioxidant (11) | 2 | 2 | 2 | 2 |
| DPG (12) | 1.5 | 1.5 | 1.5 | 1.5 |
| Sulphur | 2 | 2 | 2 | 2 |
| Accelerator (13) | 1 | 1 | 1 | 1 |

(1) SBR solution extended using oil (content represented as dry SBR): 40.5% of styrene, 24% of 1,2-polybutadiene units, and 43% of trans-1,4-polybutadiene units (Tg = −30° C.);
(2) BR containing 0.3% of 1,2-, 2.7% of trans, and 97% of cis-1,4- (Tg = −106° C.);
(3) "Zeosil 1165" silica produced by Rhodia, HD type (BET and CTAB: approximately 160 m2/g);
(4) "Omya BLS" chalk produced by Omya (median grain size of 20 μm);
(5) coupling agent TESPT ("Si69" from Degussa);
(6) Carbon black N234 (ASTM grade);
(7) Total TDAE oil (includes SBR extending oil): "Vivatec 500" produced by H&R;
(8) C5/C9 hydrocarbon-based resin from "Escorez ECR-373" Exxson Mobil;
(9) zinc oxide (industrial grade from Umicore);
(10) stearic acid ("Pristerene 4931" from Uniqume);
(11) N-(1,3-dimethylbutyl)-N-phenyl-para-phenylenediamine ("Santoflex 6-PPD" from Flexsys);
(12) Diphenylguanidine ("DPG Perkacit" from Flexsys);
(13) N-cyclohexyl-2-benzothiazolsulphenamide ("CBS Santocure" from Flexsys).

TABLE 2

|  | Conventional example 1-1 | Example 1-1 | Example 1-2 | Example 1-3 |
|---|---|---|---|---|
| Rubber composition abrasion(mm3) | 98 | 489 | 1044 | 1662 |
| Abrasion index | 1.00 | 4.99 | 10.65 | 16.96 |

As shown in Table 2, Examples 1-1, 1-2 and 1-3 used in the flexible fences have an abrasion index that is higher than twice the conventional example 1-1 used in the tread portion. That is, the products in the examples have a faster abrasion speed than that of the conventional example 1-1. This ensures that flexible fences 4 and tread portion 2 will be abraded to a similar extent.

KEY

1 Pneumatic tire tread
2 Tread portion
3 Primary groove
31 Opposing wall of primary groove
32 Opposing wall of primary groove
33 Base part of primary groove
4 Flexible fence
41 Base part of flexible fence 4 (connecting part with groove base part 33 of primary groove 3)
42 Side part of both sides of flexible fence 4
5 Tread contact patch

The invention claimed is:

1. A tread for a pneumatic tire that is formed from a rubber composition and that contacts the road surface when the tire rolls, comprising:
   a tread portion, in which is formed at least one primary groove of depth D and width W having a base surface and two opposing walls, and
   multiple flexible fences of thickness E, which extend inside the primary groove such that at least 70% of the cross-sectional area of the primary groove is closed and which are disposed at intervals such that at least one of the multiple flexible fences in the primary groove is in the tread contact patch when the tire is rolling,
   wherein the multiple flexible fences are formed from at least a rubber composition for fences that is different from the rubber composition for the tread portion; and the rubber composition of the flexible fences has an abrasion index that is greater than or equal to twice the abrasion index of the rubber composition of the tread portion.

2. The tread according to claim 1, wherein the thickness E of the flexible fences is greater than or equal to 0.3 mm and less than or equal to 1.0 mm.

3. The tread according to claim 1, wherein the rubber composition for fences comprises a microparticulate filler.

4. The tread according to claim 3, wherein the microparticulate filler in the rubber composition for fences is selected from the group consisting of chalk, natural silicates, precipitated silica, alumina, chemically synthesized fillers, barium sulphates, metal oxides, and organic fillers, and mixtures thereof.

5. The tread according to claim 4, wherein the content of microparticles of the microparticulate filler in the rubber composition for fences is greater than or equal to 50 phr.

6. The tread according to claim 5, wherein the rubber composition forming the tread portion includes a microparticulate filler, and the content of microparticles of the microparticulate filler is less than 30 phr.

7. The tread according to claim 6, wherein the abrasion index of the rubber composition for fences is greater than or equal to four times, and less than or equal to twenty times the abrasion index of the rubber composition of the tread portion.

8. The tread according to claim 4, wherein the organic fillers are selected from the group consisting of short fibers, thermoplastic fibers, biodegradable compounds, cellulose derivatives and mixtures thereof.

9. The tread according to claim 6, wherein the content of microparticles of the microparticulate filler in the rubber composition forming the tread portion is less than 20 phr.

* * * * *